(12) United States Patent
Lee et al.

(10) Patent No.: US 7,690,605 B2
(45) Date of Patent: Apr. 6, 2010

(54) SUPPORT STRUCTURE TORQUE TRANSFER FUNCTION

(75) Inventors: Yung-Ta Lee, Sinjhuang (TW); Yu-Tsun Hsu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 26 days.

(21) Appl. No.: 12/176,359

(22) Filed: Jul. 19, 2008

(65) Prior Publication Data

US 2009/0134286 A1 May 28, 2009

(30) Foreign Application Priority Data

Aug. 14, 2007 (TW) .............................. 96129967 A

(51) Int. Cl.
*A47F 5/12* (2006.01)
(52) U.S. Cl. ...................... 248/133; 248/371; 248/922; 361/679.02
(58) Field of Classification Search ................. 248/371, 248/133, 393, 917, 919–923; 361/679.02
See application file for complete search history.

(56) References Cited

U.S. PATENT DOCUMENTS

| | | | | |
|---|---|---|---|---|
| 6,822,857 B2* | 11/2004 | Jung et al. | ............ | 361/679.02 |
| 7,338,019 B2* | 3/2008 | Liu et al. | ............... | 248/123.11 |
| 7,404,233 B2* | 7/2008 | Lu et al. | ....................... | 16/302 |
| 7,494,104 B2* | 2/2009 | Baek | ........................ | 248/372.1 |
| 7,497,410 B2* | 3/2009 | Lee | ............................. | 248/398 |
| 7,513,468 B2* | 4/2009 | Jung et al. | .................. | 248/133 |
| 2007/0272809 A1* | 11/2007 | Jang | ........................... | 248/133 |

* cited by examiner

*Primary Examiner*—Ramon O Ramirez
(74) *Attorney, Agent, or Firm*—Guice Patents PLLC

(57) ABSTRACT

The invention provides a support structure with torque transfer function including a link member having an upper end and a lower end; a pair of main brackets located on a surface of a base member and being pivotally connected to the lower end of the link member through an intermediate hinge. The link member is rotatably pivoted between the two main brackets. The base member has a pair of auxiliary brackets located at one side of the pair of main brackets. A base hinge is socketingly connected to a resilient support and disposed between the main brackets and the auxiliary brackets. A torque transfer device having upper and lower rotation parts pivoted to the intermediate hinge and the base hinge so as to move synchronously together and a connecting part linking the upper and lower rotation parts to rotate in the same direction, thereby forming a torque transmission path.

12 Claims, 6 Drawing Sheets

SUPPORT STRUCTURE TORQUE TRANSFER FUNCTION

FIELD OF THE INVENTION

The present invention relates to a support structure, and more particularly, to a support structure with torque transfer function.

BACKGROUND OF THE INVENTION

The support structure is to connect with a supporter, a platform for example, on which objects, notebook computer for example, can be rested. As a result, the support structure is said to have a receiving function. The platform on the top is usually capable of being adjusted in height with respect to the base on the bottom. When in use, the height between the platform and the base is adjusted appropriately to meet users' demand, whereas, when not in use, the platform is lowered to the lowest position to save space.

Recently flat panel displays, such as liquid crystal display (LCD) monitors, LCD TVs, or plasma TVs, have the advantages of lightweight, thinness, and radiation-free and thus have gradually replaced conventional cathode ray tube (CRT) monitors. Consequently, a support structure has become an essential accessory for flat panel displays. Since there is a limit of the view angle for liquid crystal display and plasma TVs, at least a hinge structure is usually disposed between the support structure and the base such the tilting angle of flat panel displays can be adjusted with respect to the base.

However, this practice cannot provide flat panel displays in height and along forward/backward direction. Therefore, a parallel-arranged auxiliary connection device has been developed; for example, the tops of two linkage bars are connected to a main hinge on the top and a base hinge at the bottom of a connection member, respectively. For example, an invention "Monitor Improved in a Tilting Structure" applied for Chinese patent and authorized on Mar. 8, 2006 (correspond to U.S. Pat. No. 6,822,857), a pairs of auxiliary link member to connect the main and base hinges are connected to form a four bar linkage, which in turn transform the rotation of the link member with respect to the base member into the tilting movement of the monitor main body. In other words, when the height of the monitor is be adjusted by moving the link upward and downward direction to tilt the monitor, only the link member and the second and third frictional springs (bushes) rotate about the third and fourth hinge pins, such that the monitor body maintain its tilting angle during the height control.

For the aforementioned support device, it is preferably that the friction force between the base hinge and the connection device is larger than the torque induced by the weight of the monitor main body. A torsion spring, disposed between the base hinge and the connection device, is on one end connected to the connection device and on the other end connected to a bracket of the base hinge. Therefore, the torque generated in the torsion spring will be in the opposite direction to that of the base rotating downward along the connection device. The torque in the torsion spring is preferably to roughly equal to the torque induced by the weight of the monitor main body; therefore, the torques can be cancelled out. Consequently, users need only exert a small amount of force to rotate the connection device with respect to the base.

Since the torsion spring has long been disposed between the base hinge and the connection device, the style design of the entire support structure is limited and dull. if the torsion spring can be moved to other place of the support structure, a torque transfer mechanism is required for the torsion spring and the base hinge, which demands urgent attention.

SUMMARY OF THE INVENTION

In view of the foregoing shortcomings of the prior art, the inventor of the present invention based on years of experience in the related industry hopes to overcome the drawback that the aforementioned resilient support, torsion spring for example, of the support structure can only be disposed between the base hinge and the connection device, thereby seriously restricting the style design of the support structure. It is hoped that the change in torque resulted from the tilting adjustment of the connection device can be transferred to the resilient support part disposed elsewhere through a torque transfer device. Such a design can realize the diverse styles of the support structure and thus meet consumers' demands. After numerous experiments and tests, "support structure provided with a torque transfer function" according to the present invention has been achieved.

Accordingly, it is an aspect of the present invention to provide a support structure with torque transfer function, comprising a link member, whose bottom and top portions have an upper end and a lower end, respectively; a pair of main supports oppositely and perpendicularly disposed at the surface of the base member and are pivoted to the lower end of the link member through an intermediate hinges, such that the link member is rotatably pivoted between the two main brackets; a base member having a pair of oppositely and perpendicularly arranged auxiliary brackets disposed at one side of the pair of main brackets, a base hinge pivoted between the pair of main brackets and the pair of auxiliary brackets, and a base hinge socketingly connected to a resilient support and disposed between the main brackets and the auxiliary brackets, respectively, having one end passing through the auxiliary bracket and socketingly connected to a linkage part and the other end passing the main bracket; and a torque transfer device having upper and lower rotation parts pivoted to the intermediate hinge and the base hinge so as to move synchronously together and a connecting part linking the upper and lower rotation parts to rotate in the same direction, thereby forming a torque transmission path.

Another aspect of the present invention is to provide a support structure with torque transfer function, further comprising a support which is pivoted to the upper end of the link member through the support hinge so as to render the support rotatable with respect to the link member. Further, the support hinge pivoted to the upper end of the link member through two upper hinges supporting parts, such that link portions extending from the bottom of the support on the respective side of the link member are also inserted thereinto by the upper pivot. The inner side of the upper end of the link member and the outer side of the link portion are connected with an end enclosure, respectively. Also, resilient parts and interference parts are disposed between the inner side of the link portion and the upper end of the link member with their total length equivalent to that of the protruded block disposed at the upper hinge supporting part and extending inward.

Yet another of the present invention is to provide a support structure with torque transfer function, wherein the support can be manufactured as two separated parts or an integrated body whose front is installed with a supported object.

Still yet another object of the present invention is to provide a support structure with torque transfer function, wherein the intermediate hinge is inserted into the lower end of the link member, an upper hinge hole at the top of the main bracket, and the upper rotation part of the torque transfer device through its two intermediate pivots, which are then end secured by an end enclosure, respectively.

Still another object of the present invention is to provide a support structure with torque transfer function, wherein the base hinge is socketingly connected to a resilient support part through its lower pivot, respectively, and the base hinge's one end is inserted through the auxiliary bracket and then socketingly connected onto a linkage part and the other end is inserted through the lower hinge hole of the main bracket and through the lower rotation part of the torsion transfer device, and the two ends are end secured with an end enclosure at the inner side of the linkage part and the outer side of the lower rotation part, respectively.

Still yet another object of the present invention is to provide a support structure with torque transfer function, wherein the resilient support part has its one end attached to the connection portion of the linkage part and the other end insertingly connected to the fastening portion around the lower hinge holes on the lower part of the main bracket.

Still yet another object of the present invention is to provide a support structure with torque transfer function, wherein the connecting part is a flexible steel cable on either end with a connection portion which is connected with the upper and lower rotation parts' fastening portions and forms cable troughs therebetween to accommodate the steel cable.

Still yet another object of the present invention is to provide a support structure with torque transfer function, wherein the connecting part is two linkage bars radially disposed on both sides of the upper and lower rotation parts.

Still yet another object of the present invention is to provide a support structure with torque transfer function, wherein the connecting part is an intermediate gear with the two rotation parts being upper and lower gears, which are engaged together.

Still yet another object of the present invention is to provide a support structure with torque transfer function, wherein the connecting part is a belt with the two rotation parts being upper and lower pulleys.

BRIEF DESCRIPTION OF THE DRAWINGS

The present invention can be more fully understood by reference to the following description and accompanying drawings, in which.

DETAILED DESCRIPTION OF THE INVENTION

Figure 1:
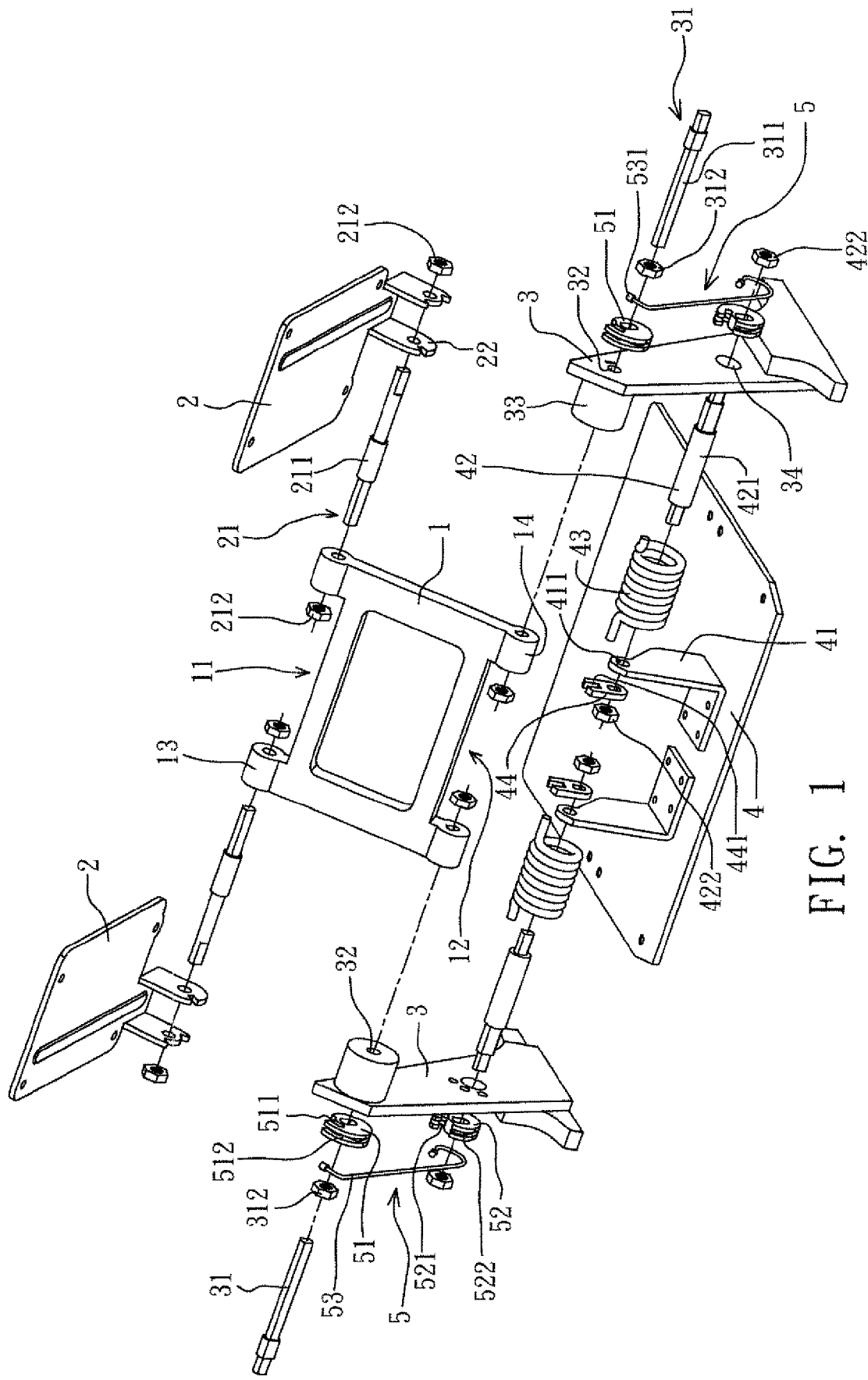
FIG. 1 schematically illustrates an exploded perspective view of a support structure according to the present invention.
Figure 2:
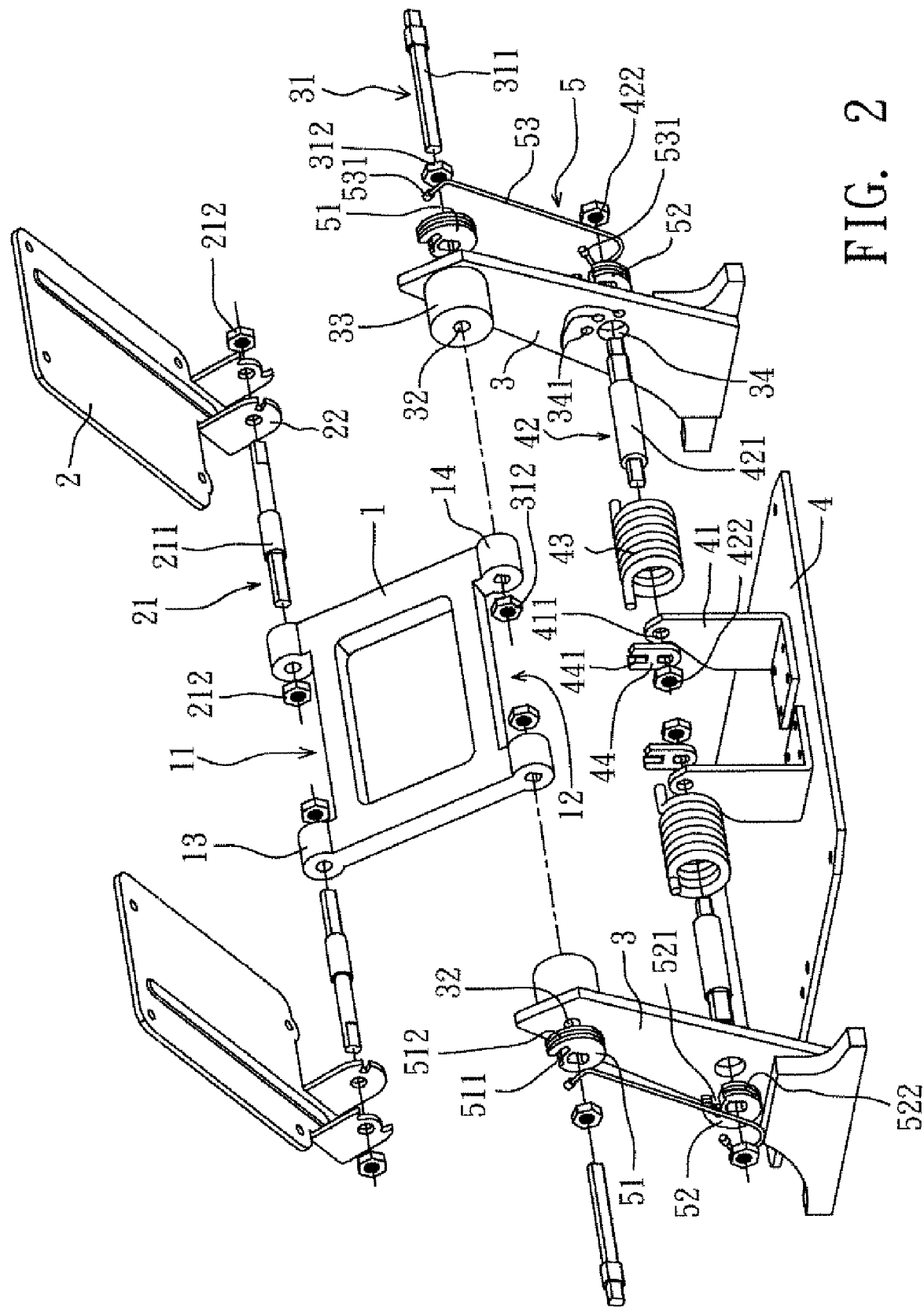
FIG. 2 schematically illustrates an exploded perspective view of a support structure from another view angle according to the present invention.

With reference to FIGS. 1 and 2, a support structure according to the present invention comprises a link member 1, a support 2, a pair of main brackets 3, a base member 4, and a torque transfer device 5.

The link member 1 is plate body, whose top and bottom have an upper end 11 and a lower end 12, respectively, such that a support hinge 21 and an intermediate hinge 31 are pivoted to a support 2 and a pair of main brackets 3, thereby achieving a rotatable condition. As shown in the aforementioned figures, the upper end 11 and lower end 12 extend to form a pair of upper hinge supporting part 13 and a pair of lower hinge supporting parts 14, respectively.

The support 2 is pivoted to the upper end 11 of the link member 1 through the support hinge 21 so as to render the support 2 rotatable with respect to the link member 1. The support hinge 21 is pivoted to the upper hinge supporting parts 13 on the upper end 11 of the link member 1 through two upper pivots 211, such that the link portions 22 extending to form from the bottom of the support 2 on the respective side of the link member 1 are also inserted thereinto by the upper pivot 211. Consequently, the support 2 can rotate about the upper pivot 211 and with respect to the link member 1. As shown in the aforementioned figures, the support 2 can be manufactured as separated parts or an integrated body, whose front is installed with a supported object, a liquid crystal display (LCD) for example.

Both ends of the upper pivot 211, one at the inner side of the upper hinge supporting parts 13 and the other one at the outer side of the link portions 22 of the support 2, are respectively connected with an end enclosure 212, a self-locking nut for example, to secure the ends. Further, between the inner sides of the link portions 22 of the support 2 and the upper hinge supporting parts 13 are respectively disposed with conventional resilient part, disc spring for example, and interference part, friction facing for example (not shown), so as to induce friction torque, which is a conventional art and will not be discussed hereafter.

The two main brackets 3 are oppositely and perpendicularly disposed at the surface of the base member 4 and are pivoted to the lower end 12 of the link member 1 through the intermediate hinges 31, such that the link member 1 is rotatable with respect to the two main brackets 3. The intermediate hinge 31 is inserted into one lower hinge supporting part 14 on the lower hinge support part 14 of the link member 1, an upper hinge hole 32 at the top of the main bracket 3, and the upper rotation part 51 of the torque transfer device 5 through one of its two intermediate pivots 311, respectively, and the intermediate hinge 31 is then end secured by an end enclosure 312, a self-locking nut for example, at the inner side of the lower hinge supporting part 14 and at the outer side of the upper rotation part 51, respectively. As described earlier, the pair of the main brackets 3 are securingly installed at the surface of the base member 4 and the upper hinge hole 32 of the main bracket 3 extends inward to form a protruded block 33, whose length corresponds to the total length of the resilient parts and interference parts between the inner side of the link portion 22 and the upper hinge supporting part 13. Since the intermediate pivot 311 is a shaft with a polygon cross section, a quadrangle for example, whose outer portion is inserted into pre-disposed square holes in the lower hinge supporting part 14 and the upper rotation part 51, such that the parts concerned can be moved together as a unit. Consequently, when the link member 1 is rotated with respect to the base member 4, the intermediate pivot 311 and the upper rotation part 51 are rotated synchronously so as to transfer the torque to the upper rotation part 51.

The base member 4 is a plate body, on which a pair of main brackets 3 and a pair of auxiliary brackets 41 are oppositely and perpendicularly disposed from its center outward, respectively. Also, a base hinge 42 is pivoted between the pair of main brackets 3 and the pair of auxiliary brackets 41. The base hinge 42 is socketingly connected to a resilient support part 43, torsion spring for example, through its two lower pivots 421. One end of the lower pivot 421 is inserted into the bracket hole 411 on the top of the auxiliary bracket 41 and then is socketingly connected onto a linkage part 44, which is formed to have a connection portion 441, a U-shape groove for example, for inserting and positioning of one end of the torsion spring 43, and the lower pivot 421 is end secured with an end enclosure 422, a self-locking nut for example. The other end of the torsion spring 43 is inserted into the fastening portion 341, a multiple of fastening holes arranging in an arc form for example, around the lower hinge hole 34 of the main bracket 3. The other end of the lower pivot 421 is inserted through the lower hinge hole 34 of the main bracket 3 and then socketingly connected to an adjacent lower rotation part 52. The lower rotation part 52, lower pivot 421, and linkage part 44 can be moved together as a unit. Since one end of the torsion spring 43 is secured onto the fastening portion 341, and the other end is connected and moved along with the linkage part 44, and thus the torsion spring 43 can store energy to support the weight of the supporter.

The torque transfer device 5 is pivoted to the intermediate hinge 31 and the base hinge 42 through the upper and lower rotation parts 51 and 52, respectively, thereby moving synchronously to provide the expected torque transfer function according to the present invention. The upper and lower rotation parts 51 and 52 are connected by a connecting part 53. As shown in the figures, the connecting part 53 is a flexible steel cable. Each end of the connecting part 53 is disposed with a connection portion 531, a lump for example, respectively, which is connected with the fastening portions 511 and 521, protruded jaws for example, of the upper and lower rotation parts 51 and 52, respectively. The steel cable 53 is accommodated in the cable troughs 512 and 522 between the upper and lower rotation parts 51 and 52. Consequently, with the connecting part 53 being installed, the upper and lower rotation parts 51 and 52 can rotate in the same direction, clockwise or anticlockwise for example, and form a torque transmission path.

Further, the connecting part 53 of the present invention is not limited to the aforementioned steel cable. It can also be implemented as a linkage bar radially disposed on both sides of the rotation parts 51 and 52, respectively, so as to form a four bar linking structure; alternatively, the connecting part 53 can be a belt or even an intermediate gear with the two rotation parts being upper and lower pulleys or upper and lower gears, respectively. These alternatives can also achieve the same function of torque transfer, which is also within the protected scope of the present invention.

Figure 3:
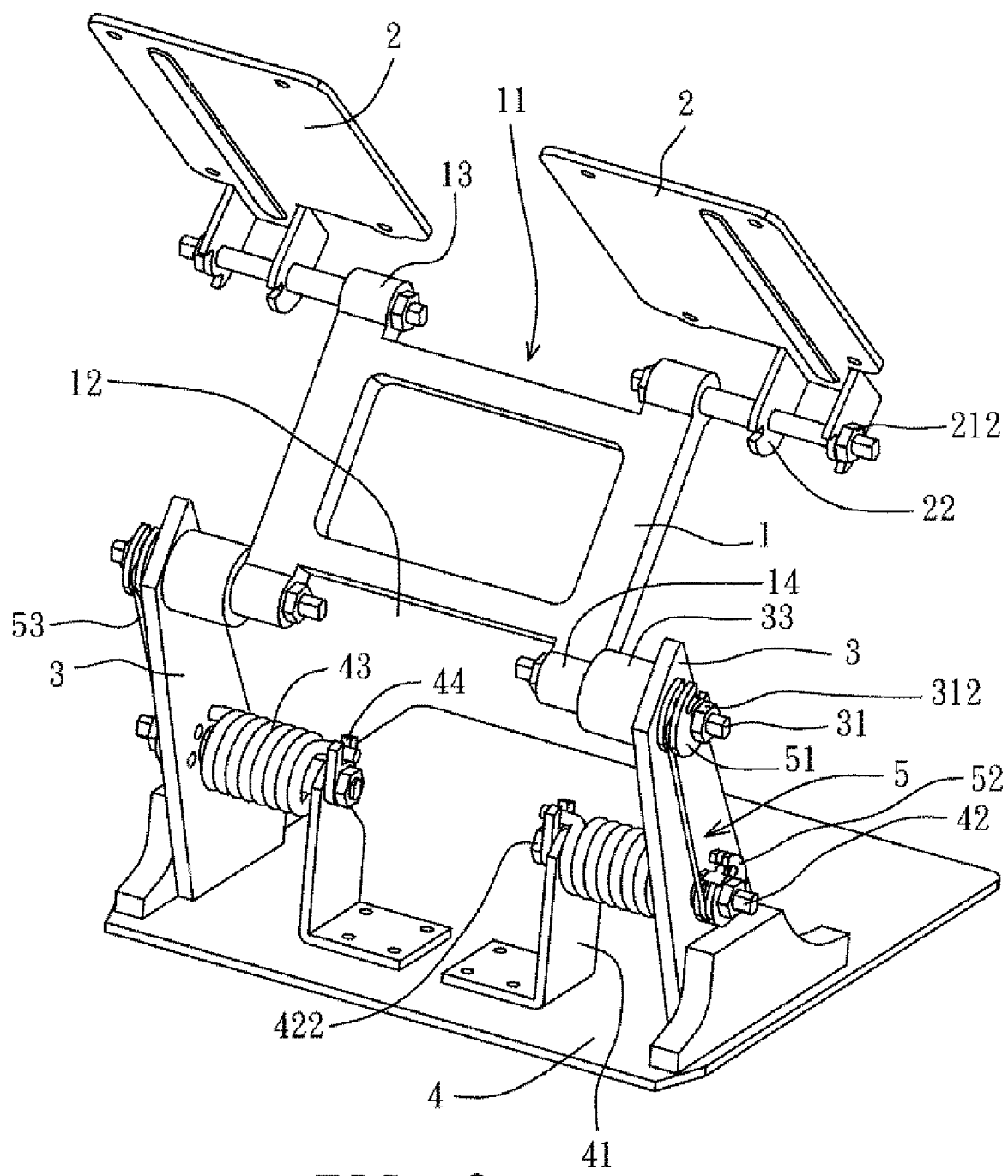
FIG. 3 schematically illustrates a perspective assembly view of a support structure according to the present invention.

With the descriptions of the aforementioned parts and their assembled configuration, the perspective assembly view of the present invention is shown in FIG. 3, wherein the front of the support 2 is connected with a supporter, a LCD monitor for example, such that the tilting angle of the monitor can be adjusted with respect to the link member 1.

Figure 4:
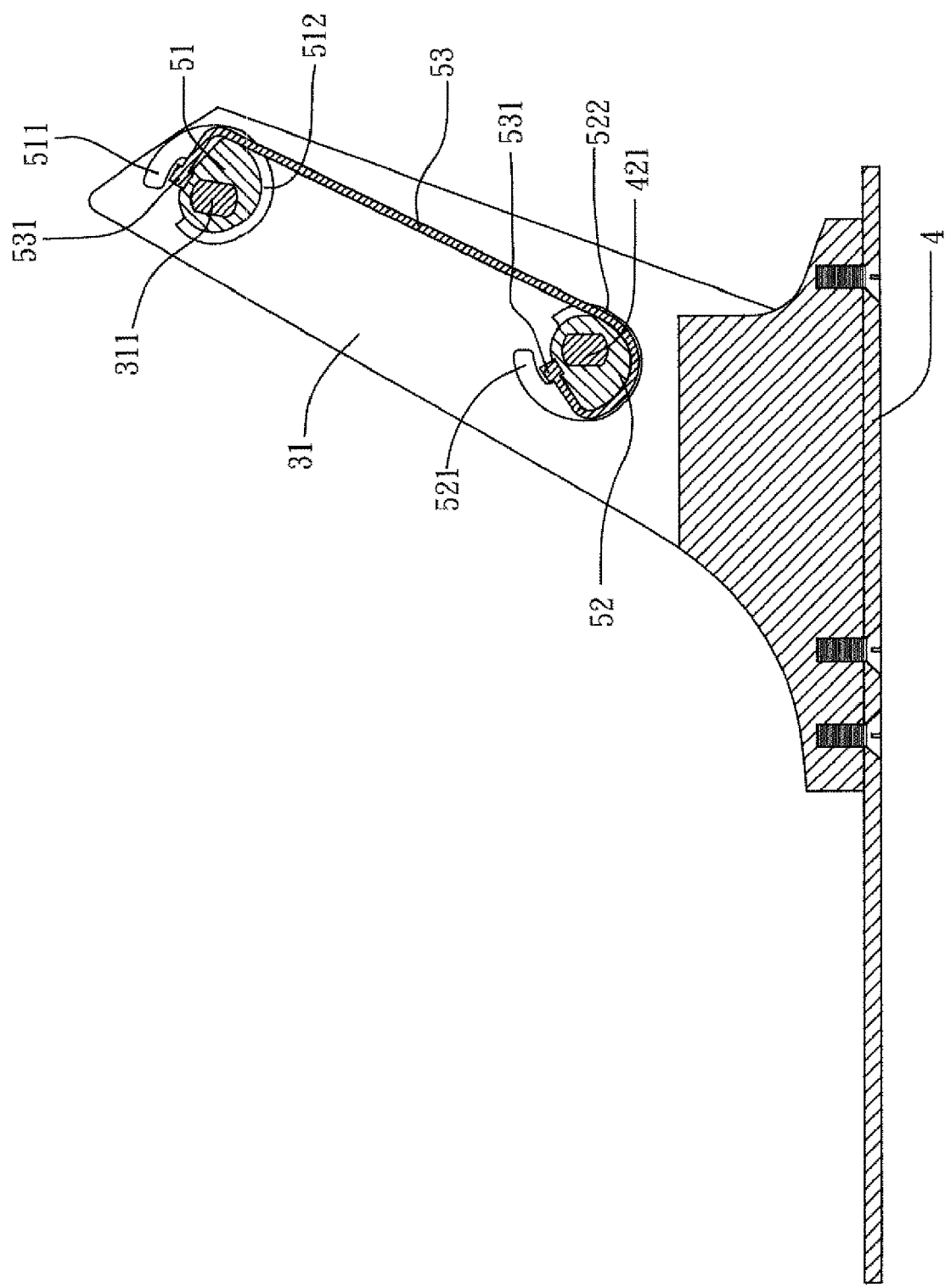
FIG. 4 schematically illustrates a cross-section view of a torque transfer device according to the present invention.

FIG. 4 shows the cross-section view of the torque transfer device 5 installed at the main bracket 3, wherein the upper and lower rotation parts 51 and 52 are shaped like cams, whose fastening portions 511 and 521 are protruded jaws, such that the lumps 531 on both ends of the steel cable 53 can be fastened thereon, respectively. Further, the steel cable 53 is accommodated in the cable troughs 512 and 522 indentedly provided on the circumference of the upper and lower rotation parts 51 and 52, thereby forming a torque transfer mechanism which can be moved together as a unit.

Figure 5:
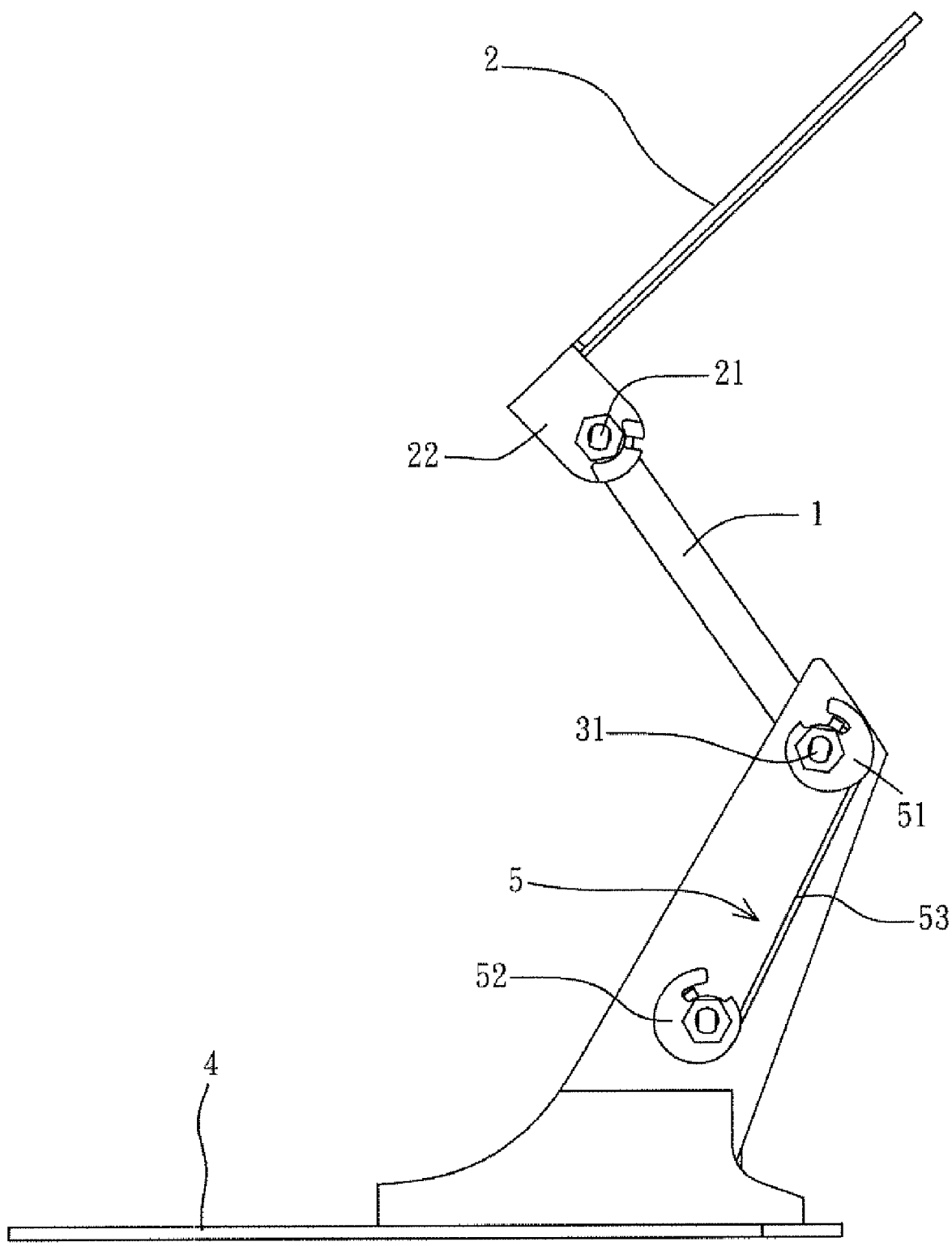
FIG. 5 schematically illustrates a side view of a support structure before adjustment according to the present invention.
Figure 6:
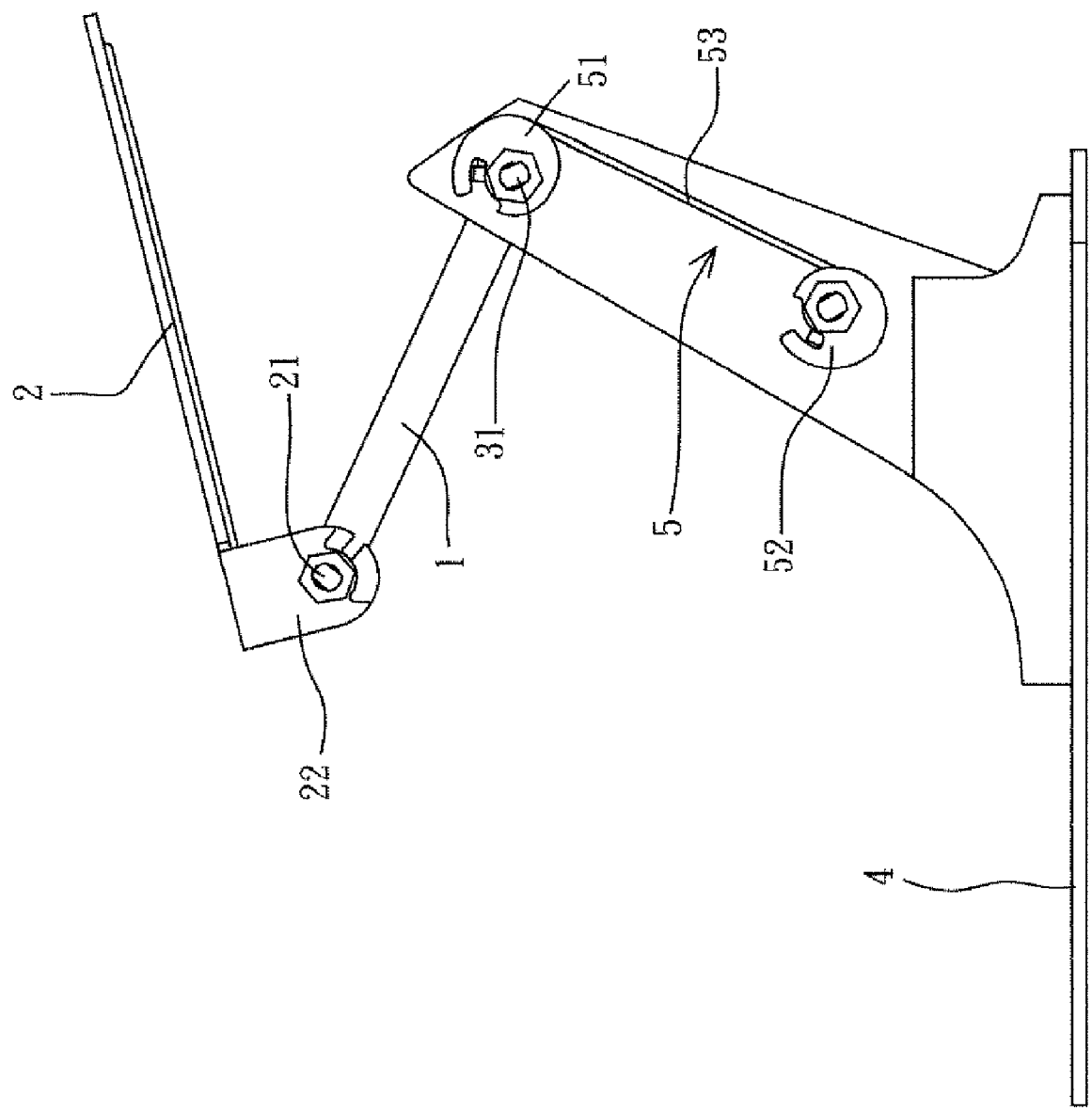
FIG. 6 schematically illustrates a side view of a support structure after adjustment according to the present invention.

With reference to FIGS. 5 and 6, the variation of the torque transfer for the support structure according to the present invention being implemented is illustrated in FIG. 5, which is a side view of FIG. 3. If the height of the supported object is to be adjusted, the link member 1 rotates in a fan-shaped movement about the two upper hinge holes 32 of the main brackets 3, thereby driving the intermediate pivot 311, the upper rotation part 51, connecting part 53, lower rotation part 52, lower pivot 421, and linkage part 44 to rotate synchronously Consequently, the movable end of the torsion spring 43 can store energy during the rotation of the linkage part 44, thereby achieving energy storing or releasing status. This energy is then facilitated in providing an auxiliary force when the support structure is in operation.

Consequently, with implementation of the present invention, the resilient support part in a conventional prior art, usually disposed between the link member and the base, is disposed somewhere else, between the base and the pair of main brackets of the link member for example. This practice can shorten the length of the link member and the base may have a larger height through the installation of the pair of the main brackets. Consequently, the support structure can be made in a variety of styles, thereby satisfying the consumers' demands. Further, the link member and the main brackets as well as the base and the main brackets are pivoted to an intermediate hinge and a base hinge, respectively. Also, the torque transfer device pivoted between the two hinges can transfer the change in torque resulted from the adjust of the link member, through the torque transfer device to render the resilient support part disposed at the base hinge to store or release energy, thereby facilitating the operation of the support structure. This invention is indeed a breakthrough to conventional art.

While the invention has been described with reference to the a preferred embodiment thereof, it is to be understood that modifications or variations may be easily made without departing from the spirit of this invention, which is defined by the appended claims.

What is claimed is:

1. A support structure with a torque transfer function comprising:
    a link member having an upper end and a lower end;
    a pair of main brackets oppositely and perpendicularly disposed on a surface of a base member and being pivotally connected to the lower end of the link member through an intermediate hinge, such that the link member is pivotally positioned between the pair of main brackets;
    the base member having a pair of auxiliary brackets oppositely and perpendicularly disposed at one side of the pair of main brackets, a base hinge pivotally connected between the pair of main brackets and the pair of auxiliary brackets, and the base hinge socketingly connected to a resilient support part and disposed between the main brackets and the auxiliary brackets, respectively, having one end passing through the auxiliary bracket and socketingly connected to a linkage part and the other end passing the main bracket; and
    a torque transfer device having upper and lower rotation parts pivotally connected to the intermediate hinge and the base hinge so as to move synchronously together and a connecting part linking the upper and lower rotation parts to rotate in the same direction, thereby forming a torque transmission path.

2. The support structure with a torque transfer function as claim in claim 1, further comprising a support pivotally connected to the upper end of the link member through a support hinge so as to render the support rotatable with respect to the link member.

3. The support structure with a torque transfer function as claim in claim 2, wherein the support hinge is pivotally connected to the upper end of the link member through two upper hinges supporting parts, such that link portions extending from the bottom of the support on the respective side of the link member are also inserted by the support hinge.

4. The support structure with a torque transfer function as claim in claim 2, wherein the inner side of the upper end of the link member and the outer side of the link portion are connected with an end enclosure, respectively, resilient parts and interference parts are disposed between the inner side of the link portion and the upper end of the link member with their total length equivalent to that of a protruded block disposed at the upper hinge supporting part and extending inward.

5. The support structure with a torque transfer function as claim in claim 2, wherein the support is manufactured as a device selected from a group consisting two separated parts and an integrated body having a front installed with a supported object.

6. The support structure with a torque transfer function as claim in claim 1, wherein the intermediate hinge is inserted into the lower end of the link member, an upper hinge hole at the top of the main bracket, and the upper rotation part of the torque transfer device through two intermediate pivots of the intermediate hinge, which are then end secured by an end enclosure, respectively.

7. The support structure with a torque transfer function as claim in claim 1, wherein the base hinge is socketingly connected to the resilient support part through a lower pivot thereof, respectively, and one end of the base hinge is inserted through the auxiliary bracket and then socketingly connected onto the linkage part and the other end is inserted through a lower hinge hole of the main bracket and through the lower rotation part of the torsion transfer device, and the two ends are end secured with an end enclosure at the inner side of the linkage part and the outer side of the lower rotation part, respectively.

8. The support structure with a torque transfer function as claim in claim 1, wherein the resilient support part has a first end thereof attached to the connection portion of the linkage part and a second end thereof insertingly connected to the fastening portion around the lower hinge holes on the lower part of the main bracket.

9. The support structure with a torque transfer function as claim in claim 1, wherein the connecting part is a flexible steel cable on either end with a connection portion which is connected with fastening portions of the upper and lower rotation parts and forms cable troughs therebetween to accommodate the steel cable.

10. The support structure with a torque transfer function as claim in claim 1, wherein the connecting part is two linkage bars radially disposed on both sides of the upper and lower rotation parts.

11. The support structure with a torque transfer function as claim in claim 1, wherein the connecting part is an intermediate gear with the two rotation parts being upper and lower gears, which are engaged together.

12. The support structure with a torque transfer function as claim in claim 1, wherein the connecting part is a belt with the two rotation parts being upper and lower pulleys.

* * * * *